(12) United States Patent
Bjork et al.

(10) Patent No.: US 6,516,744 B1
(45) Date of Patent: Feb. 11, 2003

(54) ARRANGEMENT AND METHOD FOR HOUSING LACTATING ANIMALS

(75) Inventors: Anders G. A. Bjork, Tumba (SE); Gosta Forsen, Tullinge (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/719,097

(22) PCT Filed: Jun. 9, 1999

(86) PCT No.: PCT/SE99/01008

§ 371 (c)(1),
(2), (4) Date: Feb. 21, 2001

(87) PCT Pub. No.: WO99/63808

PCT Pub. Date: Dec. 16, 1999

(30) Foreign Application Priority Data

Jun. 10, 1998 (SE) .............................................. 9802056

(51) Int. Cl.⁷ ................................ A01J 3/00; A01J 5/00
(52) U.S. Cl. .................................................... 119/14.02
(58) Field of Search .............................. 119/14.03, 416, 119/14.08, 14.14

(56) References Cited

U.S. PATENT DOCUMENTS

| | | | | |
|---|---|---|---|---|
| 3,223,070 A | * | 12/1965 | Gribble et al. | 119/14.03 |
| 3,545,407 A | * | 12/1970 | Moore | 119/502 |
| 4,362,127 A | * | 12/1982 | Nielsen et al. | 119/14.03 |
| 5,069,160 A | * | 12/1991 | Street et al. | 119/14.08 |
| 5,183,008 A | * | 2/1993 | Carrano | 119/155 |
| 6,019,061 A | * | 2/2000 | Schulte | 119/14.03 |
| 6,186,093 B1 | * | 2/2001 | Finn et al. | 119/14.03 |

* cited by examiner

Primary Examiner—Charles T. Jordan
Assistant Examiner—Judith Nelson
(74) Attorney, Agent, or Firm—Young & Thompson

(57) ABSTRACT

A method and an arrangement for keeping lactating animals in a loose-housing system. A milking stall is provided between a resting and a feeding section. First to third identification gates respectively are arranged between the resting and feeding sections and fourth identification gate is arranged at an entrance gate to the milking stall. By means of a transponder carried by each animal and a transponder reader located at each identification gate a control device is activated. The control device is associated with operating equipment related to each gate to maneuver the gates dependent on the transponder-related status of the animal.

29 Claims, 2 Drawing Sheets

ARRANGEMENT AND METHOD FOR HOUSING LACTATING ANIMALS

TECHNICAL FIELD OF THE INVENTION

The present invention relates to an arrangement and a method for keeping lactating animals in a loose-housing system comprising at least one milking stall provided between resting and feeding sections of said system, said milking stall being provided with at least one milking robot and entrance- and exit-gates and said system being provided with means for identification of said animals, said milking stall and identification means being connected to a control device for selective milking of the animals.

BACKGROUND OF THE INVENTION

In the Netherlands Journal of Agricultural Science 45 (1997), W. Rossing et al., it is stated that animal behaviour in relation to automatic milking is crucial for the welfare of the cows. A positive aspect is said to be the fact that high-yielding cows have increased lying times when milked more times daily (Ipema et al., 1988). A lower tension in the udder which offers more comfort to the cow to lie down, might explain the increased lying times.

In an automatic milking system cows are no longer milked in batches but more or less one by one throughout the day. No significant disruptions to diurnal patterns of activity have been recorded (Winter et al., 1992). Adaptation to increased frequency of milking was achieved through maintenance of lying time and compensatory feeding occurring at milking time.

At present, automatic milking designs are based on sequential access of cows over a twenty-four-hour period, with a feed as a reward to attract them. Nevertheless, in barns where the cows are free to choose their own movements to visit the automatic milking system, for a certain number of cows the preferred milking frequency will be difficult to reach. Therefore one-way cow routing systems have been introduced in the barns, which systems may be regarded as a kind of active selection. This active selection guarantees visits of all cows to the automatic milking system, but inhibits the cows' movements through the cow shed and the animals spend less time at the feeding gate. (Ketelaar-de Lauwere, 1992; Winter et al., 1992). It is therefore advised that active selection should not be applied for long periods.

By EP-A1 636 312 and EP-A2 636 313 is previously known a construction using active selection for automatically milking animals. A shed, in which the animals can move about freely, is provided with a milking box coupled to a selection box, a couple of feeding stations and a plurality of resting boxes and a special reception area as well.

All of the resting boxes, feeding stations and also the selection box are each provided with an identification sensor which, together with a transponder to be carried by the animals, forms part of an identification system. The sensors are linked to a computer system, by means of which it can be established which animal is present at any moment in which resting box or in which feeding station and also how long the animals have already rested more particularly in the resting boxes. The resting boxes and feeding stations are equipped with a flash light and an expelling member, in order to force an animal to leave its current position.

Upon reporting at the selection box, it will be determined whether an animal is to be milked or not. In the negative case, the animal is guided back to the walking area of the shed but, in the positive case, the animal is allowed to proceed to the milking box. An ill or unproductive animal may be separated from the herd by leading it from the milking box to the special reception area.

By EP-A2 677 243 is previously known a method as initially defined for automatically milking animals and an implement for applying same illustrated by means of a shed organisation in the form of a loose-housing having cubicles and feeding stations arranged in combination with a walking area, so that the animals basically can walk around the shed, near one end of which there is a milking box. Next to the milling box there is an isolation area, which can be reached from the milking box or the walking are via respective doors. The isolation area can be used to separate the animals in categories, e.g. diagnosed-mastitis-animals, animals to be inseminated, animals which report to the milking box to be milked again too short a period of time after the previous milking etc.

As soon as an animal has entered the milking box, the animals identity will be established by means of a recognition system used therefore, which will obtain access to a data file present in a computer of the system for this animal. In this file has been recorded inter alia how much time has elapsed since her previous milking turn.

By means of the computer, the number of animals which are led from the milking area to the isolation area can be updated. There are also manually operable counting means, which are connected to the computer. The entering and leaving of the milking box and the isolation area is effected by means of computer-controlled doors.

Hence it is described in prior art to identify an animal in the milking box and to count the number of animals, which are led from the milking box to the isolation area('243). Further, it is known from prior art to identify the animals in the resting boxes, feeding stations or in the selection box and to force the animals to leave the resting boxes and feeding stations when desired by the system ('312, '313).

It is desirable to avoid negative stress, which can occur as a result of the active selection as described in the above prior art. Therefore a new arrangement using passive selection is proposed, according to which each animal is free to move within the shed and can make its own choice when to visit the automatic milking system, the feeding gate or the resting area, without being compelled from one place to another.

A certain control will still be required though, to prevent dominating cows from occupying the milking stall or feeding gate etc. to often. Otherwise it would be difficult for less dominant cows to get milked and fed on a proper timing corresponding to their individual twenty-four-hour rhythm.

According to the invention, it is therefore advantageously arranged that the animals are not exposed to the negative stress of being pushed around in the system. Advantageously, the possibility to get a sufficient update on the status and pattern of movement of an animal is still being maintained. Hereby, each animal will be stimulated to follow its own individual day and night rhythm.

SUMMARY OF THE INVENTION

An object of the invention is to solve the described problems with regard to previously known arrangements, by providing an improved method and arrangement for keeping lactating animals such as cattle, goats, sheep, horses, buffaloes and the like in a loose-housing system.

The problems are solved by an arrangement as initially defined characterized in that the identification means involve at least one identification gate, which is provided between the resting and feeding sections and at least one identification gate, which is associated with the entrance gate to the milking stall, and that each gate is manoeuvrable between a first state and a second state by means of the control device.

A corresponding method as initially defined to solve the above problems is characterized in that each animal is free to move in the loose-housing system at its own option, by being allowed to pass through at least one identification gate, which is separately provided between the feeding section and the resting section, when said animal is scheduled as not due for milking by the control device Hereby is achieved that an animal which is due for milking is allowed into the milking stall. An animal which is not due for milking is not allowed into the milking stall, but besides that free to move between the sections in the loose-housing system. The latter animal can change its mind and pass one or more gates between the feeding- and resting-sections as desired in one direction or the other. These advantages will avoid negative stress which otherwise would occur in systems where the animals are pushed around in the system.

Advantageously, a possibility is also achieved to get a picture of the status and pattern of movement of each animal, which also will be stimulated to follow its own day and night rhythm.

Advantageous developments and improvements of the invention are characterized by the features of the dependent claims.

BRIEF DESCRIPTION OF THE DRAWINGS

The invention will be described in more detail only as an example in the following description by means of embodiments shown in the accompanying schematic drawings.

DESCRIPTION OF THE PREFERRED EMBODIMENTS

Figure 1:
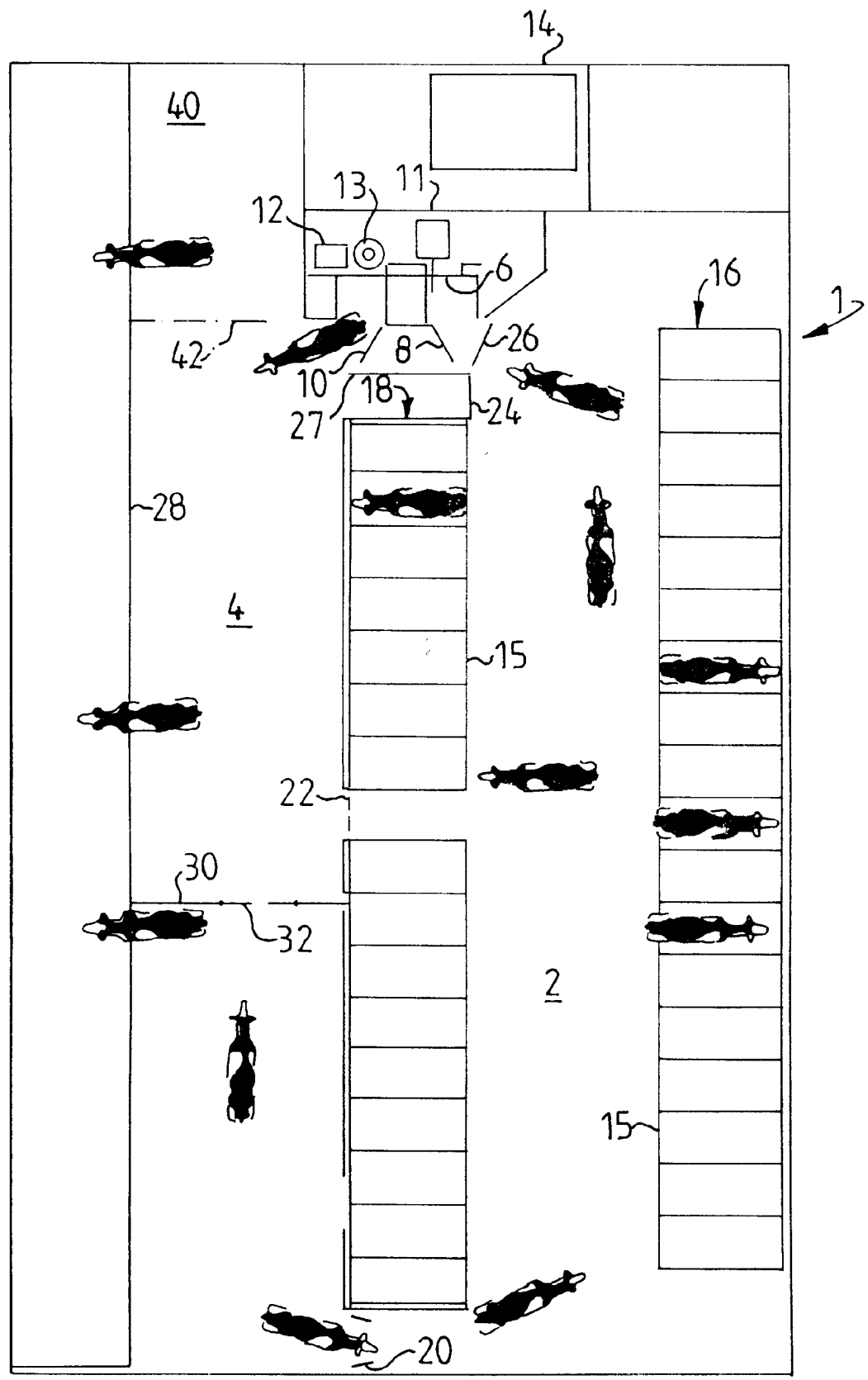
FIG. 1 is a plan view of a loose-housing system according to the invention.

FIG. 1 shows a loose-housing system which is comprised of a shed or an area 1 in which animals can move about freely, which area is divided into a resting section 2 and a feeding section 4. A milking stall 6, details of which appear from FIG. 2 and the following description, is located at one end of said area 1 and is provided with an entrance gate 8 towards the resting section and an exit gate 10 towards the feeding area. A milking robot 11, which is connected to a control device 12 and any further equipment required for manoeuvring the robot and collecting the extracted milk including for example a receiver 13 and a milk tank 14, is associated with the milking stall.

The resting section 2 may be equipped with a plurality of booths 15 arranged one after another in two parallel, first 16 and second 18 lines respectively. The first line 16 is located adjacent a first surrounding wall in the resting section of the area 1 and the second line 18 is arranged as a divider between the resting section 2 and the feeding section 4. An optional amount of passageways provided with gates, in this embodiment advantageously first 20, second 22 and third 24 identification gates, are arranged in the second row to selectively allow the animals to pass from one section to the other. Additionally a fourth identification gate 26 may be arranged in a passageway between the entrance gate 8 and the resting section, to selectively allow the animals to pass said passageway and report at the entrance gate.

In the embodiment shown in FIG. 1 the fourth identification gate 26 is advantageously arranged between the end of the second booth-line 18 which is near the milking stall 6 and a wall 27 on said milking stall. As appear from FIG. 1, the entrance-8 and exit-10 gates are associated with the milking stall as to allow an animal to enter respectively exit said milking stall 6 when said gates 8, 10 are in a first state and to stop entrance to respectively exit from the milking stall 6, when said gates 8, 10 are in a second state. The milking stall is closed by said gates 8, 10 when in said second state. Hence, an animal is allowed to pass in either direction through a passageway between the resting-2 and feeding-4 sections, said passageway being formed between the closed gates 8, 10 of the milking stall and the wall 27 of the milking stall 6, provided that at the same time the animal is allowed to pass through the fourth identification gate 26.

The feeding section 4 may be equipped with a feeding passage 28 alongside a second surrounding wall, which is opposite to the first surrounding wall in the resting section 2. The feeding passage may be conventionally supplied with fodder, concentrate and water and the feeding section may be devided into two or more subsections, by means of one or more dividing walls 30 in which a fifth identification gate 32 is located, to selectively allow the animals to pass from one subsection to another.

Figure 2:
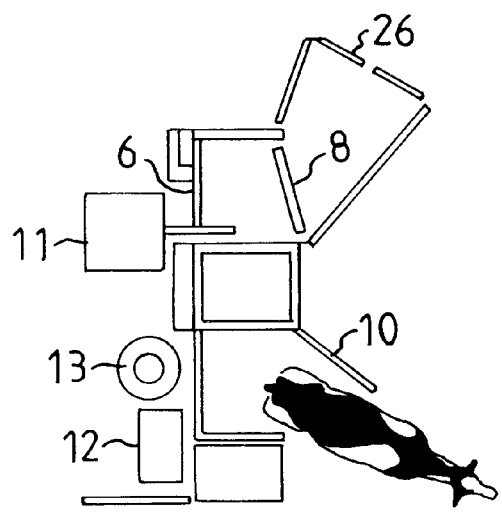
FIG. 2 is a view of a milking stall of the system in FIG. 1.
Figure 3:
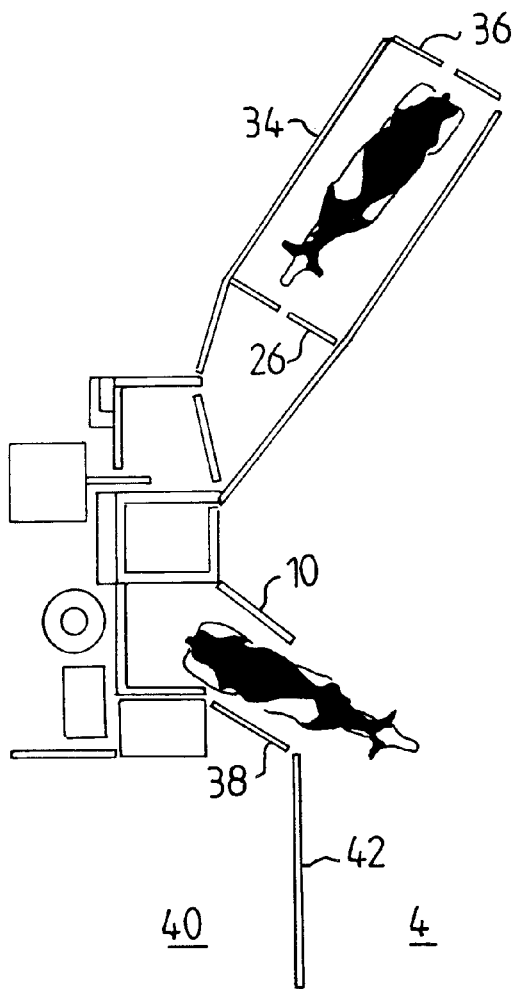
FIG. 3 discloses a waiting pen and a separation gate associated with the milking stall in FIG. 2.

FIG. 3 discloses an advantageous embodiment of a milking stall in FIG. 2, in which the passageway between the entrance gate 8 and the resting section 2 is prolonged over the fourth identification gate 26 by means of a waiting pen 34. A sixth identification gate 36 is located at the free end of the waiting pen towards the resting section 2, to selectively allow the animals to enter into the waiting pen 34. Even if shown in FIG. 3, it may be convenient to omit the identification gate 26 as not being required for identification purposes in this particular case with the waiting pen 34.

Advantageously a separation gate 38 may be associated with the mil king stall 6 adjacent to the exit gate 10 and arranged to guide animals with a differing status to a separation section 40, which may be arranged in the feeding section 4 by means of a separating wall 42, which is arranged to interact with the separation gate and the exit gate. The separated animals may be manually or automatically transferred from said separation section 40 by means of a not shown gate of a common type.

All of the gates in the system, e.g. the entrance gate 8, the exit gate 10, the separation gate 38 and the first to sixth identification gates 20–26, 32 and 36 respectively, may be of any conventionally used kind, so long each gate is rapidly manoeuvrable by means of the control device 12 between a first state, in which an animal is allowed to pass through the gate and a second state, in which an animal is stopped by the gate. Each gate may be open and/or unlocked in its first state and closed and/or locked in its second state. Hence the gates may be of a conventionally hinged-, sliding- or revolving-door type and with a single or a double door-blade design, such as a "saloon-door" type. When unlocked the latter gate may be pressed open by an animal and urged to a closed position by means of a spring load or by gravity force. The gates may be provided with a conventional gate operating and locking equipment, e.g. which is electrically, pneumatically, hydraulically, mechanically manoeuvred or combinations thereof.

Each of the first to sixth identification gates 20–26, 32 and 36 may be provided with a not shown transponder reader of a common kind, which is capable of instantly identifying a transponder carried by each animal, when the animal reports at the appropriate identification gate. Hereby it is achieved that the control device 12 may generate signals corresponding to the relevant appearance and status of the animals at the identification gates, e.g. the movements of the animals may be monitored in dependence of if an animal is stopped or let through a specific identification gate. Said first to sixth identification gates are namely preferably designed to allow an animal to pass in one direction or the other and may be equipped with a transponder reader capable of detecting the passing direction of the animal. Alternatively or in combination with a transponder reader, the identification gates may be provided with sensors, e.g. photo-cells, on each side of each gate for the same purpose.

Hence, an animal, which is due for milking and reports at the identification gate 26 which is located at the entrance gate 8, is identified by means of its transponder and the transponder reader or sensor associated with the identification gate 26. If the milking stall 6 is free and available said animal is allowed to enter and a milking sequence is initiated. If not the animal is alternatively allowed to pass by the milking stall to the feeding section 4 or stopped at the identification gate 26, depending on if the animal is due for feeding or not respectively.

If an animal is reporting at any side of any of the other identification gates of the system, the animal is stopped or allowed to pass the gate depending on the present status of the animal. Therefore, it is even possible for the animal to pass one gate in one direction and then change its mind and return in the other direction through the same gate. Moreover the animal may pass through several identification gates in different directions or may be stopped by more than one identification gate. Consequently, it is possible separate an animal with the status "alarm animal" from the herd and keep it in the separation section 40. It is even possible to assemble all animals in one of the subsections on either side of the dividing wall 30, if one part of the feeding passage 28 of the feeding section 4 needs to be cleaned up.

What is claimed is:

1. Arrangement for keeping lactating animals in a loose-housing system comprising at least one milking stall (6) provided between resting (2) and feeding (4) sections of said system, said milking stall (6) being provided with at least one milking robot (11) and entrance-(8) and exit-(10) gates and said system being provided with means (20, 22, 24, 26, 32, 36) for identification of said animals, said milking stall (6) and identification means (20, 22, 24, 26, 32, 36) being connected to a control device (12) for selective milking of the animals, characterized in that the identification means involve at least one identification gate (20, 22, 24, 26, 32, 36), which is provided between the resting (2) and feeding (4) sections and at least one identification gate (26, 36), which is associated with the entrance gate (8) to the milking stall (6), and that each gate (8, 10, 20, 22, 24, 26, 32, 36) is manoeuvrable between a first state and a second state by means of the control device (12).

2. Arrangement according to claim 1, characterized in that first (20), second (22) and third (24) identification gates are provided between the resting and the feeding section and a fourth identification gate (26) is located at the entrance gate (8).

3. Arrangement according to claim 1, characterized in that a plurality of identification gates (20, 22, 32) are provided at different locations separated from the milking stall.

4. Arrangement according to claim 1, characterized in that each identification gate (20, 22, 24, 26, 32, 36) is a reversible passing-through gate, to allow an animal to pass the gate in one direction or the other.

5. Arrangement according to claim 1, characterized in that each identification gate (20, 22, 24, 26, 32, 36) is manoeuvrable between a first state, in which an animal is allowed to pass through the gate and a second state, in which an animal is stopped by the gate.

6. Arrangement according to claim 1, characterized in that a fourth identification gate (26) and a sixth identification gate (36), one after the other, are associated with the entrance gate (8) to the milking stall.

7. Arrangement according to claim 1, characterized in that a separation gate (38) is associated with the exit gate (10) from the milking stall.

8. Arrangement according to claim 1, characterized in that the control device (12) is programmable to manoeuvre each gate (8, 10, 20, 22, 24, 26, 32, 36) individually between its first and second states, in response to individual control signals generated by means of the control device (12) via the appropriate identification gate (20, 22, 24, 26, 32, 36) in combination with a transponder carried by each animal.

9. Arrangement according to claim 8, characterized in that each gate (8, 10, 20, 22, 24, 26, 32, 36) is open in its first state and closed in its second state.

10. Arrangement according to claim 8, characterized in that each gate (8, 10, 20, 22, 24, 26, 32, 36) is unlocked in its first state and locked in its second state.

11. Arrangement according to claim 8, characterized in that the control signals are representative to the current status of the animal in question.

12. Arrangement according to claim 11, characterized in that the control device (12) is programmed to open the entrance gate (8) when the control signals indicate that the milling stall (6) is available and empty and an animal which is due for milking reports at the entrance gate (8).

13. Arrangement according to claim 11, characterized in that the control device (12) is programmed to lock the entrance gate (8) when the control signals indicate that an animal is not due for milking.

14. Arrangement according to claim 11, characterized in that the control device (12) is programmed to lock the entrance gate (8) when the control signals indicate that an animal is due for milking but the milking stall (6) is occupied.

15. Arrangement according to claim 11, characterized in that the control device (12) is programmed to lock the entrance gate (8) when the control signals indicate that an animal is due for milking but the milking stall (6) and a waiting pen (34) associated with the same are occupied.

16. Arrangement according to claim 11, characterized in that the control device (12) is programmed to lock the entrance gate (8) when the control signals indicate that the milking robot (11) is in system cleaning mode.

17. Arrangement according to claim 11, characterized in that the control device (12) is programmed to lock the entrance gate (8) when the control signals indicate that there is an animal scheduled for milking in the milking stall (6).

18. Arrangement according to claim 11, characterized in that the control device (12) is programmed to lock the entrance gate (8) when the control signals indicate that an operator has set the entrance gate (8) to closed status.

19. Arrangement according to claim 11, characterized in that the control device (12) is programmed to open the exit gate (10) when the control signals indicate that an animal not scheduled for milking is present in the milking stall (6).

20. Arrangement according to claim 11, characterized in that the control device (12) is programmed to open the exit gate (10) when the control signals indicate that the milking is done.

21. Arrangement according to claim 11, characterized in that the control device (12) is programmed to close the exit gate (10) when the control signals indicate that the milking stall (6) is empty and a predetermined period of time has passed since the exit gate (10) was opened.

22. Arrangement according to claim 11, characterized in that the control device (12) is programmed to open each identification gate (20, 22, 24), which is separately provided between the feeding section and the resting section, when an animal which is scheduled as not due for milking reports the appropriate identification gate (20, 22, 24).

23. Arrangement according to claim 1, characterized in that each identification gate (20, 22, 24, 26, 32, 36) is associated with a transponder reader.

24. Method for keeping lactating animals in the loose-housing system according to claim 1, wherein each animal is free to move in the loose-housing system at its own option, by being allowed to pass through at least one identification gate (20, 22, 24), which is separately provided between the feeding section (4) and the resting section (2), when said animal is scheduled as not due for milking by the control device (12).

25. Method according to claim 24, characterized in that an animal is allowed to pass through the separately provided identification gate (20, 22, 24) in one direction, from the feeding section (4) to the resting section (2), when said animal is scheduled as due for mil king by the control device (12).

26. Method according to claim 24, characterized in that an animal is allowed to enter the milking stall (6) by means of individual manoeuvring of each gate (8, 10, 20, 22, 24, 26, 32, 36) in response to individual control signals generated by means of the control device (12) upon influence of a transponder carried by each animal, when said control signals indicate that the mil king stall (6) is available and empty and an animal which is due for milking reports at the appropriate gate.

27. Method according to claim 24, characterized in that an animal with a differing status departing the mil king stall (6) is guided to a separation section (40) by means of a separation gate (38) associated with the exit gate (10).

28. Method according to claim 24, characterized in that the present location of each animal is determinable, at least to a specific section, by means of mutual interaction via the control device (12) each time an animal passes one of the identification gates (20, 22, 24, 26, 32, 36).

29. Method according to claim 24, characterized in that the entrance-(8) and exit-(10) gates, via the control device (12) are arranged to interact with the identification gate (26) such, that an animal which is due for milking is prevented to enter the milking stall (6) when it is occupied, said animal, if due for feeding, being allowed to pass to the feeding section (4), and said animal being allowed to enter said milking stall (6) when it is free.

* * * * *